United States Patent [19]

Watine et al.

[11] 4,271,330
[45] Jun. 2, 1981

[54] HEAT-RECOVERABLE ARTICLES

[75] Inventors: Didier J. M. M. Watine, Maisons-Laffitte; Christian P. Nadal, Magny en Vexin, both of France

[73] Assignee: Raychem Pontoise S.A., Saint Ouen l'Aumone, France

[21] Appl. No.: 41,388

[22] Filed: May 22, 1979

[30] Foreign Application Priority Data

May 23, 1978 [GB] United Kingdom ............... 21327/78
Sep. 21, 1978 [GB] United Kingdom ............... 37692/78

[51] Int. Cl.³ ............................................. H01R 4/02
[52] U.S. Cl. ........................... 174/84 R; 174/DIG. 8; 174/78
[58] Field of Search .................. 174/78, 84 R, DIG. 8

[56]  References Cited
U.S. PATENT DOCUMENTS 3,200,190  8/1965  Forney ................................. 174/78 X
3,305,625  2/1967  Ellis ..................................... 174/84 R Primary Examiner—Roy N. Envall, Jr.
Attorney, Agent, or Firm—Lyon & Lyon

[57]   ABSTRACT

The invention relates to an article suitable for making an electrical connection between two electrical conductors, for example an earth conductor and the outer conductor of a coaxial cable. The article comprises a heat-shrinkable sleeve and a quantity of solder which is held by and/or on the sleeve, and is positioned eccentrically within the sleeve. Two discrete quantities of solder may be used.

40 Claims, 12 Drawing Figures

HEAT-RECOVERABLE ARTICLES

The present invention relates to a heat-recoverable article suitable, for example, for making an electrical connection between two electrical conductors and to a connection method using such an article.

Many articles and methods have been proposed for covering one or more substrates and/or for joining a plurality of substrates, for example for making an electrical connection between two electrically conductive substrates. Thus, for example, U.S. Pat. No. 3,243,211 discloses articles comprising a heat-shrinkable sleeve and a quantity of fusible material positioned within the sleeve. The fusible material may be, for example, a polymeric material or an inorganic fusible material, for example solder. An electrical connection between two conductors can be made, for example, by inserting the conductors in a sleeve which contains solder and heating the assembly to cause the sleeve to shrink and the solder to fuse.

A number of other specifications also describe articles which comprise a heat-shrinkable sleeve having a quantity of solder therein. Thus, for example, U.S. Pat. No. 3,324,230 describes an electrical connector which comprises a terminal pin (or similar electrical conductor) provided with a quantity of solder and having a heat-recoverable sleeve firmly installed thereon by shrinking one end of the sleeve into close contact with the pin. Moreover, U.S. Pat. No. 3,313,772 discloses a heat-shrinkable sleeve having a ring of solder therein and a ground lead (earth conductor) a portion of which is positioned between the solder ring and the sleeve.

While the articles referred to above have proved extremely useful in a wide variety of applications, they are not applicable in certain circumstances. Thus, for example, the connector described in U.S. Pat. No. 3,324,230 is designed to facilitate the connection of a further conductor to the terminal pin, and is not ideally suited to, for example, facilitating the connection of an earth conductor to the outer conductor (normally braid) of a coaxial cable. Furthermore, although the article referred to above and disclosed in U.S. Pat. No. 3,312,772 is designed for the latter use, there are circumstances in which its use can give rise to problems.

The present invention is concerned with the provision of an article comprising a heat-shrinkable sleeve containing solder, which is of use in making a connection between a first conductor, for example an earth conductor, and a second conductor, for example the outer conductor of a coaxial cable, and with the provision of a connection method using such an article.

The present invention provides an article which comprises a heat-shrinkable sleeve open at at least one end and a quantity of solder positioned eccentrically within the sleeve and held by and/or on the sleeve, the solder being such that it does not extend round the entire inner circumference of any cross-section of the sleeve.

The quantity of solder may, if desired or required, have an appropriate amount of flux associated therewith. In one embodiment of the invention, the solder is preferably not associated, in the article before installation on the conductors to be joined, with any electrically conductive member which is infusible at the temperature to which the article is heated to cause the heat-shrinkable sleeve to shrink and the solder (and flux if present) to fuse. The quantity of solder is advantageously actually in contact with the inner surface of the sleeve.

In a cross-section through the article of the invention in the region of the quantity of solder, the area of the solder is advantageously small relative to the total area enclosed by the sleeve and the same is preferably also true in a longitudinal section through the article in the region of the quantity of solder. Advantageously, in a cross-section through the article in the region of the solder the solder does not extend across the centre of the area enclosed by the sleeve and in such a cross-section the solder preferably does not protrude significantly into the area enclosed by the sleeve. Advantageously substantially all the solder is relatively close to the inner surface of the sleeve, and the quantity of solder is preferably positioned so as to permit the insertion into the article of a elongate article (for example the outer conductor of a coaxial cable) having dimensions only slightly smaller than those of the interior of the sleeve. Advantageously the circumferential extent of the solder in the sleeve is small relative to the inner circumference of the sleeve. The quantity of solder is advantageously localised at one or more portions of the inner circumference of the sleeve, that is in one or more segments of the sleeve. Preferably the solder is localised at one or more portions of the inner surface of the sleeve. Advantageously at least part of the solder is positioned in a projection of the outer circumference of the sleeve, which projection preferably substantially disappears on free recovery of the sleeve and fusing of the solder. The solder may if desired be partially enclosed by the material of the sleeve with part of the solder protruding, preferably to only a small extent, from the inner surface of the sleeve.

The quantity of solder may have any desired shape. In one advantageous embodiment of the invention, the quantity of solder is shaped and positioned such that when in use an elongate substrate (for example an earth conductor) is received in the sleeve and a portion of the elongate substrate is positioned in proximity to the quantity of solder, at least part of the solder is positioned between the said portion of the elongate substrate and the portion of the sleeve radially outwards of the said portion of the elongate substrate. In order to achieve this, at least part of the quantity of solder may, for example, be generally 'C'- or 'U'-shaped in cross-section, at least part of the exterior surface of the 'C' or 'U' advantageously being in contact with the inner surface of the sleeve.

The quantity of solder may comprise two parts spaced apart to permit the insertion of an elongate substrate, for example an earth conductor, between them. The two parts advantageously lie in a common cross-section of the sleeve and may be close to each other in the sleeve, but not quite touching, such that, for example, an elongate substrate of relatively small diameter may be positioned between them for connection to an elongate article of larger diameter which is also positioned within the sleeve. The configurations of the two parts may be such that the solder can retain the elongate substrate (for example an earth conductor) in a substantially fixed position in the sleeve and if each of the two parts is partially enclosed by the sleeve material (in which case part of the solder may be said to have sleeve material "wrapped" round it) with a part thereof protruding from the inner surface of the sleeve, the conductor may if desired be held in position by the projecting parts of the solder. The two parts may, for example, be opposed portions of a quantity of solder at least part of which is generally 'C' or 'U'-shaped in cross-section. Alternatively, for example, the two parts may be provided by two separate quantities of solder. Instead of being close to each other, two separate quantities of solder may be positioned substantially diametrically opposite each other in the sleeve, or may be otherwise spaced apart from each other. The or each quantity of solder may, if desired, be in the form of a ball.

The solder may be held by or on the sleeve in any desired manner. Advantageously, at least part of the solder is held in a projection of the outer circumference of the sleeve, which projection preferably substantially disappears on shrinking of the sleeve and fusing of the solder. Thus, for example, the sleeve may be provided with a receptacle for the solder by heating and deforming outwardly a portion of the sleeve and maintaining the deforming force while that portion of the sleeve cools. A receptacle formed in such a manner will, on heating, tend to recover its original shape and will thus tend to force solder contained therein towards the interior of the sleeve. Alternatively, for example, the quantity of solder may be positioned adjacent to the interior wall of a heat-shrinkable sleeve, the sleeve then being partially shrunk, under such conditions that the solder does not fuse, so that the interior wall partly surrounds the solder and the solder is firmly retained in the sleeve, complete recovery of the sleeve being prevented, where necessary, by mandrels.

In a further embodiment, the sleeve may comprise, for at least part of its length, two longitudinally extending compartments which are side-by-side to each other, one of the compartments (the small compartment) having a small cross-sectional area relative to the other (the large compartment). The quantity of solder, which in this embodiment is advantageously in the form of a ball, is retained in the small compartment, preferably being gripped by the inner walls of the small compartment. The compartments are, at least in the region of the solder and preferably throughout the length of the small compartment, in communication with each other. In use an elongate substrate, for example an earth conductor can be inserted in the small compartment whereby it is guided towards the solder, and on contact with the solder the end portion thereof may be deflected to a position in the large compartment in register with the solder, the solder thus acting both as a stop and as a means for guiding the substrate. If an elongate article is positioned in the large compartment and heat applied to cause the sleeve to shrink and the solder to fuse, at least part of the solder can flow into the large compartment to make a connection between the substrate and the article. An article wherein the sleeve comprises two longitudinally extending compartments may be made by any suitable method, for example by the use of a mandrel or by moulding.

It is, of course, also possible to use a sleeve which comprises two or more layers in which, for example, inner and outer layers cooperate to hold the solder, the arrangement being such that, on shrinking of the sleeve and fusing of the solder, the solder can, if it is not already in the desired location, be forced by the sleeve into that location. Where layers of a multi-layer sleeve cooperate to hold the solder, the solder may, if desired, also be held in a projection in the outer circumference of the sleeve, which projection advantageously substantially disappears on shrinking of the sleeve and fusing of the solder.

In one example of a sleeve comprising inner and outer layers which cooperate to hold the solder, or assist in holding the solder, the inner layer may extend for only part of the length of the outer layer, the solder, for example, a solder ball or solder wire, being positioned adjacent to an end, within the sleeve, of the inner layer such that part of the solder is sandwiched between the inner and outer layers; during installation of such an article the inner and outer layers may cooperate to "squeeze" the solder into a desired location. In a second example of such a sleeve, the inner layer could extend for substantially the entire length of the outer layer, the solder being held between the layers in register with an aperture in the inner layer through which, in use, molten solder can be forced. A further example of an inner layer of the sleeve that could cooperate with an outer layer to hold the solder is an inner layer of open cross-section. Thus, for example, a resilient inner layer of substantially 'C'-shaped cross-section could be used, a quantity of solder being held between the two arms of the 'C'.

Of course the inner layer referred to above can be replaced by any other inner part of the sleeve that can hold the solder. Alternatively, for example, the solder could be stuck to the sleeve (and thus held on the sleeve) by, for example, sticky flux.

The heat-shrinkable sleeve used in accordance with the invention is a sleeve at least part of which will shrink on the application of heat and may comprise any material, advantageously an electrically insulating material, which may be converted to or maintained in a heat-shrinkable form. Examples of suitable materials are given in, for example, U.S. Pat. Nos. 3,086,242 and 3,297,819 and the other U.S. specifications referred to in this specification, the disclosures of all of which U.S. specifications are incorporated herein by reference. Crosslinked polymeric materials, for example crosslinked polyvinylidene fluoride, are particularly suitable. Where a sleeve comprising two or more layers is used, the inner layer(s) need not comprise the same material as the outer layer. The sleeve is advantageously sufficiently transparent to enable the soldered connection made therein to be inspected.

The sleeve may be extruded as such, or may be formed from a sheet of material (which may if desired be heat-shrinkable) opposite edges of the sheet being joined in any suitable manner, for example by the use of a peroxide, by use of a contact adhesive (for example as disclosed in U.S. Pat. No. 3,770,556), or by the use of an insert comprising a thermoplastic material and a heat-activatable crosslinking agent (see for example U.S. Pat. Nos. 3,891,490 and 3,927,233 and British Patent Specification No. 1,512,727) to form the sleeve. If desired, the opposite edges of the sheet may be provided with means for making a connection between them (see for example U.S. Pat. Nos. 3,455,336, 3,379,218, 3,530,898 and 3,574,313). Where the sleeve is formed from a sheet of material, the sheet may if desired be shaped to hold the quantity of solder before formation of the sleeve. Heat-shrinkability may, if necessary, be imparted to a sleeve by any suitable method.

Where the sleeve comprises a plurality of layers an adhesive material may, if desired, be positioned (for example in the form of a continuous or discontinuous layer) between the layers. The presence of an adhesive is not, however, essential. If the sleeve comprises inner and outer layers, the inner layer is preferably substantially infusible at the temperature to which in use the article is heated to cause the sleeve to shrink and the solder to fuse and advantageously both the inner and outer layers are heat-shrinkable. If desired, however, the inner layer may be fusible at the temperature to which in use the article is heated to cause shrinking of the sleeve and fusing of the solder, and in one embodiment, a fusible inner layer may be formed integrally with a quantity of fusible material which is positioned between the solder and the oper end of the sleeve, the fusible material preferably extending round the entire inner circumference of a cross-section of the sleeve and being in abutting relationship to the inner surface of the outer layer.

The heat-shrinkable sleeve may have any desired shape. One method by which a desired shape may be imparted comprises partial recovery of the sleeve round one or more appropriately-shaped mandrels. In one preferred embodiment of the invention, at least a portion of the sleeve is resiliently deformable in cross-section and has an inner surface of a different shape from the outer surface of an elongate article on which the article is to be installed such that on deformation the sleeve will readily receive the elongate article and, on release of the deforming force, will grip the said article. Where the elongate article is a cable of substantially circular cross-section, the interior of the said portion of the sleeve is advantageously of non-circular cross-section and preferably has two long sides and two short sides, which sides are not necessarily straight. Advantageously the said portion of the sleeve is substantially rectangular in cross-section; in this embodiment, the solder may, if desired, be associated with one or both of the shorter sides of the rectangle. During installation, slight pressure may be applied to the sides of such a sleeve of non-circular or other appropriate cross-section to impart an appropriate cross-section to the sleeve, the pressure being released after insertion of for example a cable in the sleeve so that sides of the sleeve grip the cable in position.

The sleeve may be open at one or both ends and may if desired be provided with a quantity of fusible material (for example fusible polymeric material) or other sealing material between the solder and the or each open end. The fusible material may act as a "dam" for the solder, preventing it from flowing out of the open end(s) of the sleeve during installation of the article and/or may enhance the environmental seal at the end(s) of the sleeve. Thus, the sleeve may force fused fusible material into close contact with a conductor received in the open end of the sleeve to provide a reliable seal. Alternatively, if an appropriate quantity of fusible material is provided, the sleeve and the fused fusible material could co-operate to produce a seal even at an open end that does not in use receive a substrate. Where the sleeve has a quantity of fusible material or one or more other inserts therein the fusible material or other insert may be fixed in the sleeve in any appropriate manner, for example by partial recovery of the sleeve over the insert(s) to make the latter a tight fit.

The invention also provides a method of electrically connecting first and second electrical conductors, which comprises positioning the conductors in an article according to the invention and heating to cause the heat-shrinkable sleeve to shrink and the solder to fuse and make a connection between the conductors. Advantageously, a portion of each conductor is positioned in register with the solder.

When the quantity of solder comprises two parts spaced apart from each other, the first conductor is advantageously positioned between, and may if desired contact and be retained in position by, the two parts. The two parts may if desired act as positioning means for the first conductor. The first conductor may be, for example, an earth conductor and the second conductor may be, for example, the braid of a coaxial cable.

Articles constructed according to the invention may readily be manufactured without the use of complicated tooling. Furthermore, as the solder is positioned eccentrically within the sleeve and is held by and/or on the sleeve, substrates to be connected may be inserted into the sleeve such that they are in proximity to the solder and, on heating, the sleeve can force the molten solder directly radially inwardly into contact with at least one and preferably both of the substrates. Where the solder comprises two parts adjacent to each other, the solder may also act as additional positioning means and, optionally, retaining means for one of the substrates.

Articles constructed in accordance with the invention, which comprise eccentrically positioned solder, may be used to provide a localised soldered joint. Thus, solder may be provided at the location(s) where it is desired to form a connection without the use of excess solder which may after fusing be present in undesired locations; for example, where an earth conductor is connected to the outer conductor of a coaxial cable, the use of the article of the invention may result in there being substantially equal amounts of solder on the earth conductor and on the outer conductor in the final assembly. Furthermore, because it is necessary to fuse only the amount of solder which is required to form the joint, a smaller amount of heat is required, thus lessening the risk of overheating, for example, the sleeve, which in turn may make it possible if desired, to use solder of a higher melting point than would be possible if for example a complete ring of solder were used. Where the sleeve comprises more than one layer of material (in order, for example, to hold the solder), the inner layer may act to give additional protection to, for example, cable insulation having a low temperature rating which might otherwise be adversely affected by the heat applied to cause shrinkage of the sleeve.

As indicated earlier, at least part of the sleeve itself may be shaped to grip an elongate article, for example a cable, to which a connection is to be made. At least part of such a sleeve may be such that it can be deformed during installation and, on release of the deforming forces, will grip the cable or other article. The fact that the sleeve does grip the elongate article may ensure that the sleeve is maintained in a preferred orientation in relation to the elongate article (and is preferably also so maintained during heat-recovery of the sleeve) and/or may provide means for ensuring that, for example, a further article or member is in the correct position relative to the elongate article and/or to an insert within the sleeve. Thus, for example, in the case of the article of the invention wherein at least part of the sleeve has a substantially rectangular cross-section, the fact that the sleeve may, before (and preferably also during) recovery, grip an elongate article positioned in it makes it possible, if this is desired, to ensure that the solder is in a preferred orientation relative to the elongate article. Moreover, portions of the sleeve that, before recovery, are spaced from the elongate article may, in co-operation with the outer surface of the elongate article, define one or more compartments for locating a further substrate in a desired position, for example in relation to the elongate article and/or in relation to the solder. The fact that the sleeve and elongate article contact each other where the sleeve grips the cable may also, if the solder is appropriately positioned, assist in maintaining molten solder in a desired location during recovery of the article.

The situation described above in connection with articles comprising solder positioned eccentrically within a heat-shrinkable sleeve is in contrast to the situation in the case of, for example a device as disclosed in U.S. Pat. No. 3,312,772 which contains a complete ring of solder. In the case of such a device it has now been found that a relatively large ring of solder and hence a relatively thick sleeve is in practice required if sufficient solder is to be present at the desired location (i.e. at the point where the connection is to be made between the earth conductor and the outer conductor), so that a considerable quantity of heat must be applied to ensure complete shrinking of the sleeve and fusing of the solder, with the attendant possiblity of overheating. It has also now been found that the ring of solder in U.S. Pat. No. 3,312,772 provides much more solder than is needed to connect the earth conductor with the outer conductor. This is disadvantageous, not only because it wastes solder, but also because solder may reach locations in the completed connection where it should not be.

Various embodiments of the invention will now be described in greater detail, by way of example only, with reference to the accompanying drawings, in which.

Figure 1:
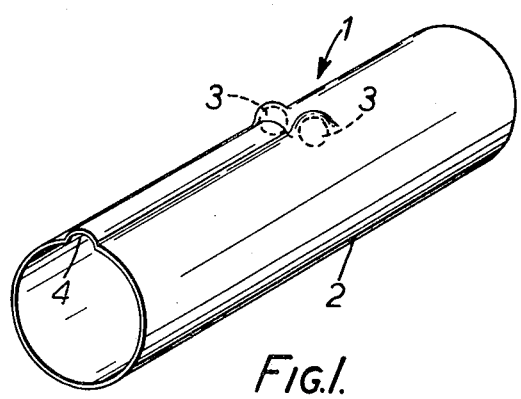
FIG. 1 shows an article according to the invention.
Figure 2:
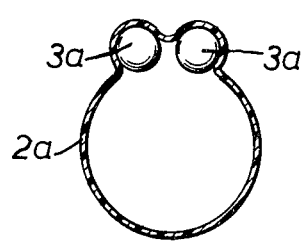
FIG. 2 is a cross-section through an article of the invention which includes two balls of solder.

Referring now to the drawings, FIG. 1 shows an article, indicated generally by the reference numeral 1, which comprises a heat-shrinkable sleeve 2 and a pair of balls 3, 3 of solder (and if desired flux) retained in the sleeve 2 by partially recovered portions of the latter. Each of the solder balls 3 is partially enclosed by the sleeve material and has a portion projecting from the inner portion of the sleeve. As can most clearly be seen from FIG. 2, the solder balls, indicated in FIG. 2 as 3a, 3a, are so positioned that a conductor, for example an earth conductor, can be positiond between them. The solder balls may act as positioning and retaining means for a conductor. The solder balls are remote from both ends of the sleeve.

Figure 3:
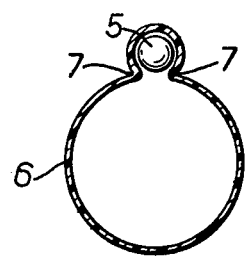
FIG. 3 is a cross-section through an article according to the invention which includes one ball of solder.

The article shown in FIG. 1 has an elongate raised portion 4, formed by partial recovery of the sleeve around a mandrel, extending from one open end to the solder balls 3, 3 to guide a conductor towards the solder balls. Although articles containing two solder balls are advantageous for some uses, for other uses one solder ball is sufficient, and FIG. 3 is a cross-section through an article containing only one solder ball 5, the solder ball 5 being retained in position in a heat-shrinkable sleeve 6 by necked-in portions 7 of the sleeve 6. The receptacle for the solder in FIG. 3 may if desired by made sufficiently large to accommodate one of the conductors to be connected.

Figure 4:
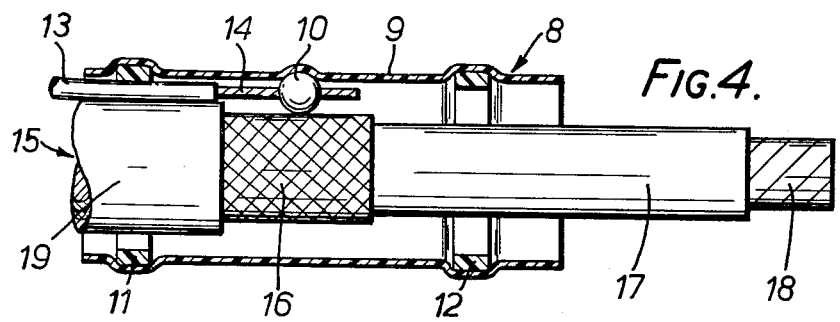
FIG. 4 illustrates the use of an article according to the invention to connect an earth conductor to the braid of a coaxial cable.

FIG. 4 shows the use of an article constructed in accordance with the invention to connect an earth conductor to the braid of a coaxial cable. The aricle of FIG. 4, which is indicated generally by the reference numeral 8, is similar to the article of FIG. 1 and comprises a heat-shrinkable sleeve 9 of electrically insulating material and two balls of solder, only one of which, indicated by the reference numeral 10, can be seen in FIG. 4. The article 8 also contains two rings, 11 and 12 respectively, of fusible polymeric material, each of the rings 11 and 12 being positioned between the balls of solder and a open end of the sleeve 9.

As is shown in FIG. 4, a stripped end portion 14 of an insulated earth conductor 13 may be positioned between the two balls of solder so that it is adjacent both to the solder (and may if desired be positioned and retained by the solder) and to an exposed length of braid 16 of a coaxial cable, indicated generally by reference numeral 15, over which the article is positioned, the cable 15 also having an exposed length of dielectric 17 and an exposed length of centre conductor 18, the length of centre conductor 18 and a portion of the dielectric 17 extending out of the end of sleeve 9. The earth conductor and the coaxial cable can be inserted into the article in either order or substantially simultaneously. When the earth conductor and the coaxial cable are positioned as indicated in FIG. 4, heat may be applied to cause the sleeve 9 to shrink and the solderballs and fusible rings 11 and 12 to fuse, whereby a soldered connection is made between the braid and the earth conductor and the sleeve 9 is sealed to the cable dielectric 17 and to the cable isulation 19 and the insulation of the earth conductor 13.

Figure 5:
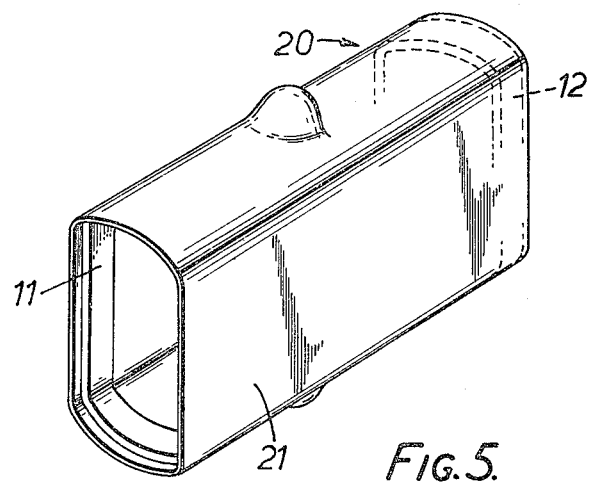
FIG. 5 is a view of a further article according to the invention.

FIG. 5 shows a perspective view of an article according to the invention wherein the sleeve, indicated generally by the reference numeral 20, is of substantially rectangular cross-section and is resiliently deformable. Pressure may be applied to the shorter sides of such a sleeve during installation thereof to cause the sleeve to adopt a substantially circular cross-section whereby, for example, a cable of circular cross-section can readily be inserted therein. On release of the pressure, the sleeve returns substantially to its original shape so that the long sides thereof grip the cable in position. The fact that the sleeve grips the cable (or other substrate) makes it possible, if this is desired, to ensure that a quantity of solder within the sleeve (see below) is in a particular location relative to the cable or other substrate, and portions of the sleeve which, before recovery, are spaced from the substrate may, in cooperation with the surface of the substrate, define one or more compartments for locating a further substrate, for example an earth conductor, in a desired location, for example in relation to the cable and/or in relation to the solder. The fact that the cable and sleeve are in contact when the sleeve grips the cable may also assist in maintaining molten solder in a desired location during recovery of the article.

Figure 6:
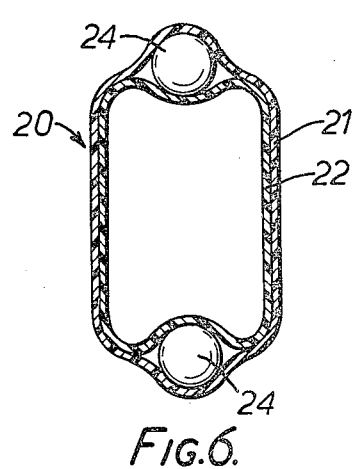
FIG. 6 is a cross-section through the article of FIG. 5.
Figure 7:
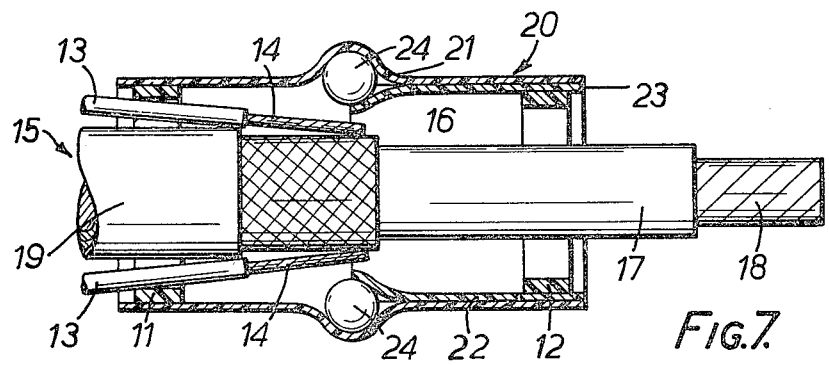
FIG. 7 illustrates the use of the article of FIGS. 5 and 6 to connect an earth conductor to the braid of a coaxial cable.

As can more clearly be seen in FIGS. 6 and 7 the sleeve 20 comprises an outer layer 21 and an inner layer 22. The inner layer 22 extends from one end 23 of the outer layer to approximately halfway along the length of the outer layer 21. On each of the shorter sides of the sleeve, the end portion of the inner layer and a portion of the outer layer in the region of the centre of the sleeve cooperate to hold a respective ball 24 of solder (and if desired flux), part of each solder ball 24 being positioned between and being held by the inner and outer layers of the sleeve; the outer layer 21 protrudes outwardly and the inner layer 22 protrudes inwardly in the region of the solder balls. The device of FIGS. 5 to 7 also comprises two rings 11 and 12 of fusible polymeric material, these rings being similarly positioned to, and performing a similar function to, the rings 11 and 12 in FIG. 4.

FIG. 7 shows the use of the article of FIGS. 5 and 6 to connect the stripped end portions 14 of two insulated earth conductors 13 to an exposed length of braid 16 of a coaxial cable 15 similar to that shown in FIG. 4. Each end portion is positioned adjacent to a respective solder ball 24. The earth conductors and the coaxial cable can be inserted into the article in any order or substantially simultaneously. When the earth conductors and the coaxial cable are positioned as indicated in FIG. 7, heat may be applied to cause the sleeve 20 to shrink and the solder balls 24 and fusible rings 11 and 12 to fuse, whereby an electrical connection is made between the braid and the earth conductors and the sleeve 20 is sealed to the cable dielectric 17 and to the cable insulation 19 and the insulation of the earth conductor 13. The fused solder is forced out from between the inner and outer layers of the sleeve during shrinkage of the sleeve and the inner layer 22 may also act as an additional protecting layer for, for example, a cable dielectric that might otherwise be adversely affected by the heat applied to cause recovery of the sleeve and fusing of the solder.

An article such as that shown in FIGS. 5 to 7 may be made by positioning tubular members of substantially circular cross-section which are to form the inner and outer layers of the sleeve around a vertical mandrel of substantially rectangular cross-section, positioning the solder balls between the two tubular members adjacent to one end of the inner member and heating the assembly at a temperature which does not cause fusing of the solder to cause the tubular members to shrink and grip the mandrel and the solder, the degree of shrinkage being such that the composite sleeve so formed is still heat-shrinkable. Although this is not essential, an adhesive material could be provided between the inner and outer layers, e.g., as an interior coating on the outer tubular member or an exterior coating on the inner tubular member.

Figure 8:
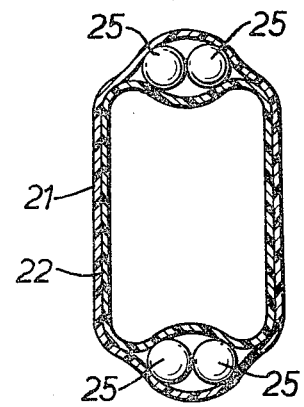
FIGS. 8 to 10 are cross-sections through further articles according to the invention.

FIG. 8 is generally similar to FIG. 6 except that each of the short sides of a cross-section through the sleeve 20 is provided with a pair of balls 25 of solder (and if desired flux). Each pair of solder balls 25 may act as positioning and retaining means for a conductor such as an earth conductor. Thus, e.g., a conductor may be received in the opening of substantially triangular cross-section defined by the two solder balls and the outer wall of the inner layer. The use of two solder balls may be advantageous where more solder is required, e.g., where a thicker conductor is to be used. It would of course, be possible for one of the short sides of the substantially rectagular cross-section to be provided with one solder ball and the other short side with two solder balls.

Figure 9:
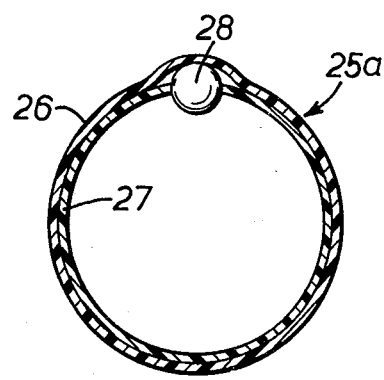

FIG. 9 is a cross-section through an article according to the invention in which the sleeve 25a comprises an outer layer 26 and an inner layer 27 of substantially 'C'-shaped cross-section, a ball 28 of solder (and if desired flux) being held between the arms of the 'C'.

Figure 10:
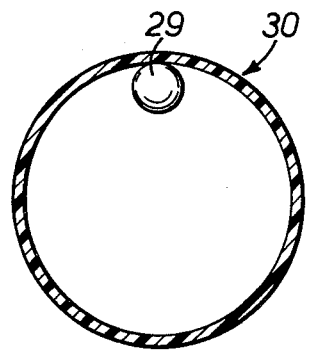

The article shown in cross-section in FIG. 10 does not include an inner layer. Instead, a ball 29 of solder is stuck to the inner wall of a heat-shrinkable sleeve 30 by means of sticky flux.

Figure 11:
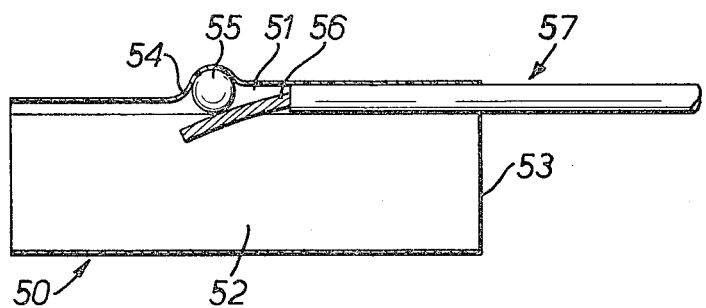
FIG. 11 shows an article according to the invention having two longitudinally extending compartments.
Figure 12:
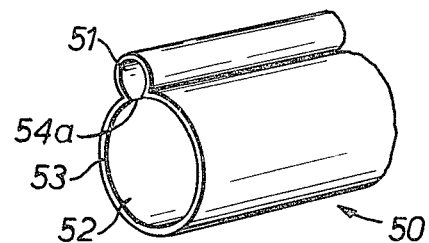
FIG. 12 is a view of one end portion of the article shown in FIG. 11.

FIG. 11 shows a article according to the invention, a view of one end of which is shown in FIG. 12, wherein the sleeve comprises two longitudinally extending compartments positioned side-by-side to each other, the article having an earth conductor inserted therein.

The article of FIG. 11 comprises a sleeve indicated generally by the reference numeral 50 comprising two compartments 51 and 52 respectively, the cross-sectional area of compartment 51 being small relative to the cross-sectional area of the compartment 52. In the article shown in FIG. 11 the compartment 51 extends longitudinally from one open end 53 of the compartment 52 to a point 54 intermediate between the ends of the compartment 52, the two compartments being in communication with each other, via a longitudinally extending opening 54a (see FIG. 12) throughout the length of the compartment 51. A ball 55 of solder is positioned in the compartment 51, and is gripped by the walls thereof, adjacent to the end 54 of compartment 51 remote from the open end 53 of the compartment 52.

In use of the article shown in FIG. 11, an uninsulated end portion 56 of an insulated conductor indicated generally by the reference numeral 57 may be inserted into the open end of the compartment 51 and the conductor 57 may be pushed along the compartment until the end 56 thereof contacts the solder ball 55 and is deflected downwards (as shown in FIG. 11) to lie below the solder ball 55 in the compartment 52. The width of opening 54 is preferably chosen such that the insulated portion of conductor 57 cannot readily pass through it. On insertion of a substrate, for example the outer conductor of a coaxial cable (not shown in FIG. 11) into the large compartment 52 and heating, a reliable soldered connection may be made between the substrate and the end portion 56, the fused solder flowing through opening 54 and the small compartment 51 shrinking tightly round the conductor 57. In the above method, the small compartment 51 acts as guide means, and the solder ball 55 also acts to guide the end portion 56 of the conductor into the desired location.

It will be noted that in all the Figures apart from FIG. 10 at least part of the solder is positioned in a projection in the outer circumference of the sleeve. In the case of the sleeves shown in the drawings the said projection will substantially disappear, or become less pronounced, on free recovery of the sleeve and fusing of the solder.

The embodiments of the invention in which an exclusive property or privilege is claimed are defined as follows:

1. An article which comprises a heat-shrinkable sleeve open at at least one end, and a quantity of solder positioned eccentrically within the sleeve and held by the sleeve, the solder being such that it does not extend round the entire inner circumference of any cross-section of the sleeve.

2. An article as claimed in claim 1, wherein the quantity of solder is held by and on the sleeve.

3. An article which comprises a heat-shrinkable sleeve open at at least one end, and a quantity of solder positioned eccentrically within the sleeve and held on the sleeve, the solder being such that it does not extend round the entire inner circumference of any cross-section of the sleeve.

4. An article as claimed in claim 1, 2, or 3 wherein in a cross-section through the article in the region of the quantity of solder, the area of the solder is small relative to the total area enclosed by the sleeve.

5. An article as claimed in claim 1, 2, or 3 wherein in a cross-section through the article in the region of the quantity of solder the solder does not substantially protrude into the area enclosed by the sleeve.

6. An article as claimed in claim 1, 2, or 3 wherein the quantity of solder is localised at least one portion of the inner surface of the sleeve.

7. An article as claimed in claim 1, 2, or 3 wherein the quantity of solder comprises two parts spaced apart from each other.

8. An article as claimed in claim 7, wherein the two parts lie in a common cross-section of the sleeve.

9. An article as claimed in claim 7, wherein the two parts are close to, but do not touch, each other.

10. An article as claimed in claim 7, wherein the two parts are separate quantities of solder.

11. An article as claimed in claim 10, wherein the two quantities of solder are positioned substantially diametrically opposite to each other in the sleeve.

12. An article as claimed in claim 1, 2, or 3 wherein the quantity of solder is in the form of a ball.

13. An article as claimed in claim 1, 2, or 3 wherein at least part of the solder is positioned in a projection of the outer circumference of the sleeve.

14. An article as claimed in claim 13, wherein the projection substantially disappears on free recovery of the sleeve and fusing of the solder.

15. An article as claimed in claim 1, wherein the quantity of solder is held in position in the sleeve by a partially shrunk portion of the sleeve.

16. An article as claimed in claim 1, wherein the quantity of solder is partially enclosed by the material of the sleeve.

17. An article as claimed in claim 1, wherein the sleeve comprises, for at least part of its length, two longitudinally extending compartments which are side by side to each other and one of which is of small cross-sectional area relative to the other, the quantity of solder being positioned in the compartment of smaller cross-sectional area and the two compartments being in communication with each other at least in the region of the solder.

18. An article as claimed in claim 17, wherein the compartments are in communication with each other throughout the length of the smaller compartment.

19. An article, as claimed in claim 17, wherein the quantity of solder is held by the inner walls of the smaller compartment.

20. An article as claimed in claim 1, wherein the sleeve comprises a plurality of layers which co-operate to hold the solder.

21. An article as claimed in claim 1, 2, or 3 wherein the sleeve comprises an outer layer and an inner layer which extends for part only of the length of the outer layer, the solder being held by co-operation between an end portion of the inner layer and the portion of the outer layer adjacent to said end portion of the inner layer.

22. An article as claimed in claim 21, wherein both the inner and outer layers are heat-shrinkable.

23. An article as claimed in claim 21, wherein the inner layer has a substantially 'C'-shaped cross-section, the quantity of solder being held between the arms of the 'C'.

24. An article as claimed in claim 3, wherein the solder is stuck to the inner wall of the sleeve.

25. An article as claimed in claim 24, wherein the solder is stuck to the sleeve by sticky flux.

26. An article as claimed in claim 1, 2, or 3 which also comprises a stop for limiting the axial penetration into the sleeve of a substrate which in use is received in the sleeve.

27. An article as claimed in claim 1, 2, or 3 wherein at least a portion of the sleeve is resiliently deformable in cross-section and is of non-circular internal cross-section.

28. An article as claimed in claim 1, 2, or 3, wherein at least a portion of the sleeve is resiliently deformable in cross-section and has two long sides and two short sides.

29. An article as claimed in claim 1, 2, or 3, wherein at least a portion of the sleeve is resiliently deformable in cross-section and is substantially rectangular in cross-section.

30. An article as claimed in claim 28, wherein the quantity of solder is adjacent to a short side.

31. An article as claimed in claim 1, 2, or 3 wherein the sleeve is open at both ends.

32. An article as claimed in claim 1, 2, or 3 wherein the sleeve comprises electrically insulating material.

33. An article as claimed in claim 1, 2, or 3 wherein a quantity of fusible material is positioned between the solder and the open end of the sleeve.

34. A method of electrically connecting first and second electrical conductors, which comprises positioning the conductors in an article which comprises a heat-shrinkable sleeve open at at least one end, and a quantity of solder positioned eccentrically within the sleeve and held by the sleeve, the solder being such that it does not extend round the entire inner circumference of the sleeve, and heating to cause the heat-shrinkable sleeve to shrink and the solder to fuse and make a connection between the conductors.

35. A method of electrically connecting first and second electrical conductors, which comprise positioning the conductors in an article which comprises a heat-shrinkable sleeve open at at least one end, and a quantity of solder positioned eccentrically within the sleeve and held by and on the sleeve, the solder being such that it does not extend round the entire inner circumference of the sleeve, and heating to cause the heat-shrinkable sleeve to shrink and the solder to fuse and make a connection between the conductors.

36. A method of electrically connecting first and second electrical conductors, which comprises positioning the conductors in an article which comprises a heat-shrinkable sleeve open at at least one end, and a quantity of solder positioned eccentrically within the sleeve and held on the sleeve, the solder being such that it does not extend round the entire inner circumference of the sleeve, and heating to cause the heat-shrinkable sleeve to shrink and the solder to fuse and make a connection between the conductors.

37. A method as claimed in claim 34, 35, or 36, wherein the quantity of solder comprises two parts spaced apart from each other and wherein the first conductor is positioned between the two parts.

38. A method as claimed in claim 37, wherein two parts of solder act as positioning means for the first conductor.

39. A method as claimed in claim 34, 35, or 36, wherein the first conductor is an earth conductor and the second conductor is the outer conductor of a coaxial cable.

40. An electrical connection made by the method of claim 34, 35, or 36.

* * * * *